United States Patent [19]

Holland

[11] Patent Number: 4,979,541
[45] Date of Patent: Dec. 25, 1990

[54] BRAKE BLEEDER SCREW

[76] Inventor: M. Dawson Holland, 1234 S. Third St., Louisville, Ky. 40203

[21] Appl. No.: 468,150

[22] Filed: Jan. 22, 1990

[51] Int. Cl.$^5$ ............................................. F16K 11/06
[52] U.S. Cl. .................................. 137/540; 137/538; 188/352; 251/285
[58] Field of Search ........................ 188/352; 222/520; 251/216, 218, 346, 348, 351, 354, 83, 284, 285, 325, 347, 353; 137/231, 234, 538, 540; 184/1.5

[56] References Cited

U.S. PATENT DOCUMENTS

| | | | |
|---|---|---|---|
| 568,572 | 9/1896 | Hewson | 251/351 |
| 2,046,228 | 6/1936 | Weidmann et al. | 188/352 |
| 2,064,573 | 12/1936 | Tatter | 188/352 |
| 2,771,093 | 11/1956 | Wilson | 188/352 |
| 3,050,080 | 8/1962 | Pagano | 137/614.17 |
| 3,913,619 | 10/1975 | Aulner, Sr. et al. | 188/352 |
| 4,479,511 | 10/1984 | Holland | 137/614.2 |
| 4,524,800 | 6/1985 | Holland | 251/354 |

FOREIGN PATENT DOCUMENTS

| | | | |
|---|---|---|---|
| 231380 | 12/1960 | Australia | 188/352 |
| 1445847 | 12/1966 | France | 188/352 |

Primary Examiner—George L. Walton
Attorney, Agent, or Firm—Scott R. Cox

[57] ABSTRACT

This invention is an improved brake bleeder screw for use in the removal of entrapped gases from a vehicle's hydraulic wheel brake system. It is comprised of a discharge section containing external threads and an internal passageway, an extending device such as a compression spring, which is partially contained within an internal passageway of the discharge section and a sealing mechanism with an internal passageway, a head and an opening from the outside of the sealing mechanism to the internal passageway of the sealing mechanism. This improved brake bleeder screw can be substituted for existing hydraulic brake bleeder valves and permits the one-person bleeding of a hydraulic brake system.

5 Claims, 2 Drawing Sheets

BRAKE BLEEDER SCREW

BACKGROUND OF INVENTION

1. Field of Invention

This invention relates to hydraulic brake systems. In particular, this invention relates to improved one person brake bleeder screws useful for removing entrapped gases from a vehicle's hydraulic wheel brake system.

2. Prior Art

In recent years improved methods for the bleeding of automobile hydraulic brake systems have been designed in order to eliminate air or gases present in these systems. For example, U.S. Pat. No. 4,479,511 describes a one person check valve and coupler assembly which is attached to a standard brake bleeder valve on a vehicle for the bleeding of the brake system. It incorporates a coupler between a one-way check valve and a standard bleeder valve. The coupler is a threaded nut which is threaded onto the inlet end of the valve body of the one-way check valve. The outer end of this threaded nut is slotted to slip over and behind the nipple of a standard bleeder valve. This mechanism discloses one method for the bleeding of a standard hydraulic brake bleeder valve by one person.

U. S. Pat. No. 4,524,800 describes a one-way brake bleeder check valve with a sealing cap. This one-way brake bleeder check valve is comprised of a valve body with a longitudinal passageway and an adjustable valve sealing cap which is screwed over the valve body. Contained within the valve is a compression spring pressing on a ball valve which seals off the passageway to the hydraulic wheel brake cylinder prior to the brake bleeding process. When the brake pedal is pressed, the pressure within the brake system forces the ball valve open and releases any trapped gases in the system. While this device is quite useful in the bleeding of hydraulic wheel brake cylinders, it does not replace conventional brake bleeder valves. Further, it requires two elements, 22 and 34 for successful operation.

U. S. Pat. No. 4,706,705 describes a check valve comprised of a generally tubular body including a cylindrical base and a guide sleeve. This check valve also uses a ball valve as a sealing element with two compression springs pressing on various elements of the check valve. It is considerably more complicated than the instant invention and does not replace conventional brake bleeder valves.

U. S. Pat. No. 4,524,793 describes another complicated automatic valve for bleeding air from a hydraulic fluid reserve. It is comprised of several elements which are screwed into a brake valve for bleeding of the line. Its very complexity contrasts with the simplicity of the instant invention.

While some of these patents disclose efficient methods for the removal of gases from hydraulic brake lines, many are quite complex and none can replace the standard brake valve while still permitting the bleeding of a brake system by one person.

Therefore, it is an object of this invention to provide an improved brake bleeder screw for use in bleeding hydraulic wheel brake systems.

It is another object of this invention to replace the standard brake bleeder valve contained on many commercial vehicles with an improved brake bleeder screw.

It is a still further object of this invention to provide an efficient, easy to use, inexpensive, one person brake bleeder screw for use in the bleeding of hydraulic wheel brake systems.

These and other objects and features of the present invention will become apparent to those skilled in the art from a consideration of the following detailed description, drawings and claims. The description along with the accompanying drawings provide a selected example of construction of the device to illustrate the invention.

SUMMARY OF INVENTION

In accordance with the present invention there is provided an improved brake bleeder screw for use in bleeding hydraulic wheel brake systems comprising:

(a) a discharge section containing external threads and a first internal passageway;

(b) an extending means partially contained within the first internal passageway of slid discharge section; and (c) a sealing section means with a second internal passageway partially contained within the first internal passageway of the discharge section, a head, and an opening from the outside of said sealing section means to the second internal passageway of said sealing section means.

This improved brake bleeder screw yields a safe, reliable device for the one person bleeding of hydraulic wheel brake systems. It provides a substitution for conventional brake bleeder valves and permits the efficient one-person bleeding of a hydraulic wheel brake system.

BRIEF DESCRIPTION OF THE DRAWINGS

The invention will now be described with reference to the accompanying drawings in which.

DETAILED DESCRIPTION OF PREFERRED EMBODIMENT

Figure 2:
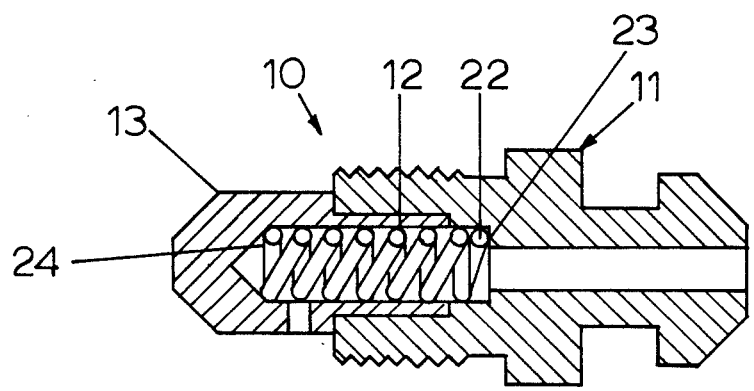
FIG. 2 is a side cutaway view of the improved brake bleeder screw.

Although the invention is adaptable to a wide variety of uses, it is shown in the drawings for purposes of illustration as embodied in an improved brake bleeder screw (10) for use in hydraulic wheel brake systems comprising a discharge section (11), an extending means, preferably a compression spring (12) and a sealing mechanism, preferably a sealing mechanism (13). See FIG. 2.

Conventional hydraulic wheel brake systems contain hydraulic fluid within a hydraulic wheel brake system (14) and attached at the end of the line is a brake bleeder valve. Conventional bleeder valves screw into the end of the hydraulic wheel brake system. When the conventional bleeder valve is opened, fluid and any trapped gases within the system can be forced out of the fluid line by pressure on the brake pedal. Once that pressure is removed from the brake, gases and other contaminants will be drawn back into the hydraulic wheel brake system unless the bleeder valve is closed prior to the removal of the pressure.

Some of the elements of the improved brake bleeder system of the instant invention are similar in structure to a conventional brake bleeder valve. In fact, the instant invention is designed to replace the conventional brake bleeder valve with its more efficient design.

Figure 1:
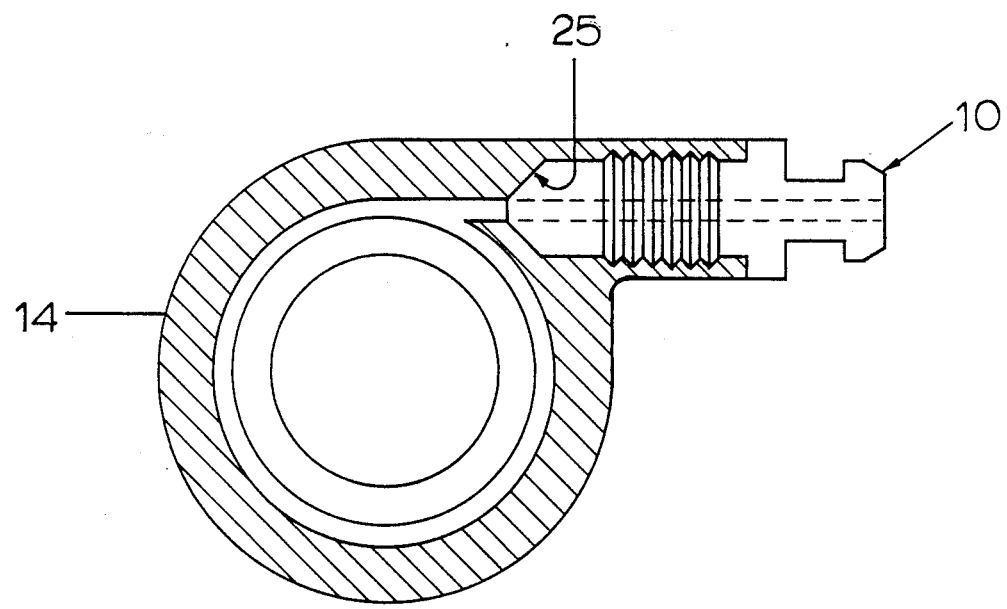
FIG. 1 is a cutaway view of a hydraulic wheel brake cylinder to which is installed the improved brake bleeder screw.
Figure 3:
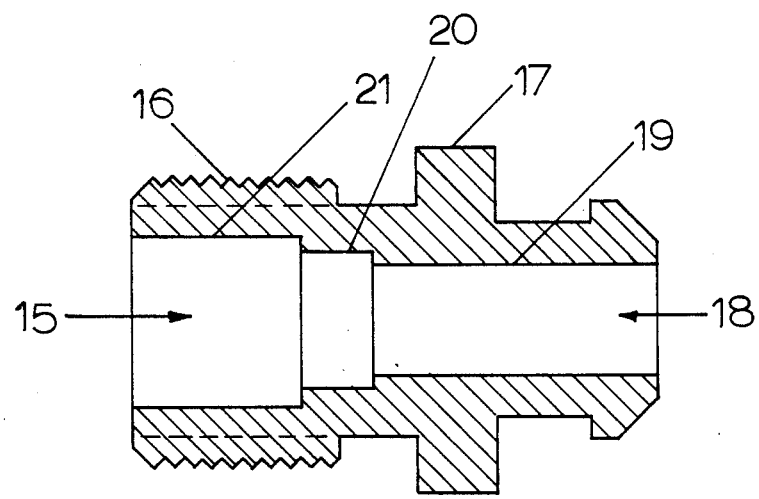
FIG. 3 is a side cutaway view of the discharge section of the improved brake bleeder screw.

The discharge section (11) of the improved brake bleeder screw (10) is similar in shape and design to the outside end of a conventional brake bleeder valve. See FIG. 1. It contains an internal opening (15), external threads (16) for screwing into the wheel brake cylinder, an internal passageway to permit the flow of fluid and gases from the system, a means for rotating the discharge section, which is preferably a hexagonally shaped portion (17) and a discharge opening (18). See FIG. 3.

The internal passageway of the discharge section has been modified from the internal passageway of conventional brake bleeder valves. The internal passageway is comprised of a first (19), second (20) and a third (21) section, each successively larger in diameter. The narrowest diameter first section (19) is in the outermost portion of the internal passageway of the discharge section. See FIG. 3. A slightly larger diameter second section (20) of the internal passageway extends further inside the internal passageway of the discharge section and a slightly larger diameter third section (21) of the internal passageway passes through the remainder of the internal passageway to the internal opening (15) of the internal passageway.

Located partially inside of the internal passageway of the discharge section and approximately the same diameter as is the second portion of the internal passageway is the extending means. See FIG. 2. This extending means pushes on the sealing section mechanism (13) of the invention to force it to close the opening in the brake cylinder. Preferably this extending means is a compression spring (12). The inner end of the compression spring (22) will fit against the internal end (23) of the third section of the internal passageway of the discharge section and the outer end of the compression spring (24) will press against the sealing means.

Figure 4:
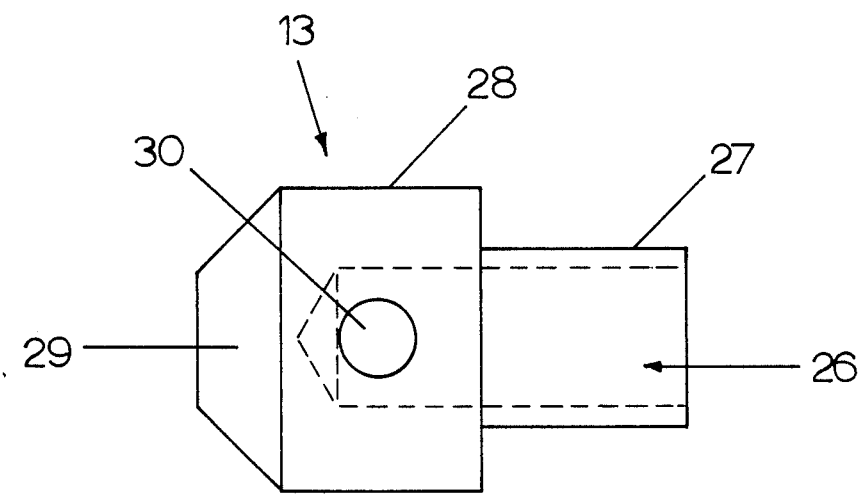
FIG. 4 is a side view of the sealing section of the improved brake bleeder screw.

The third element of the instant invention is the sealing means. See FIG. 4. The sealing means can be any conventionally shaped or sized sealing mechanism (13) which fits against the external end (25) of the hydraulic wheel brake system to prevent the flow of fluid or gases from the hydraulic wheel brake system when the improved brake bleeder screw is closed. In a preferred embodiment, the sealing mechanism is of one piece construction and contains an internal passageway (26) running partially through the sealing mechanism and is comprised of two portions. The first portion of the sealing mechanism is a tubular projection (27) designed to fit within the third section (21) of the internal passageway of the discharge section. The second portion (28) of the sealing mechanism contains a head (29) which fits against the external end (25) of the hydraulic wheel brake system. This head can be of any conventional size or shape and in a preferred embodiment is a flattened cone or a ball. The head (29) of the second portion of the sealing mechanism is designed to fit against the external end of the hydraulic wheel brake system to prevent the flow of fluid or gases from the hydraulic wheel brake system when the system is closed. The second portion also contains a sealing mechanism opening (30) passing from the outside of the second portion to the internal passageway of the sealing mechanism. This sealing mechanism opening (30) is of the same conventional size as are openings in conventional brake bleeder valves.

In operation the improved brake bleeder screw (10) is screwed into the end of a hydraulic wheel brake system (14). To bleed that hydraulic wheel brake system, the improved brake bleeder screw is partially opened by unscrewing the discharge section (11). As this discharge section is unscrewed, the extending means, preferably a spring (12), will continue to press against the sealing mechanism (13) to keep the hydraulic wheel brake system closed. After the discharge section has been partially unscrewed, the brake pedal of the vehicle is compressed. This compression will put pressure on the head (29) of the sealing mechanism forcing it back such that the tubular projection (27) of the first portion of the sealing mechanism will slide into the third section (21) of the internal passageway of the discharge section. Fluid other gases within the hydraulic wheel brake system will then pass through the opening (30) in the sealing mechanism and pass through the internal passageway (26) of the sealing mechanism through the compression spring (12) and the internal passageway (15) of the discharge section (11) out of the improved brake bleeder screw. Once the pressure is removed by releasing the brake pedal the compression spring (12) will extend and press the head (29) of the sealing mechanism against the hydraulic wheel brake system to again close the hydraulic wheel brake system preventing further discharge of fluid from the system. This operation can be continued until the hydraulic wheel brake system has been properly bled.

I claim:

1. An improved brake bleeder screw assembly for use in bleeding fluid pressure in hydraulic wheel brake systems wherein said hydraulic wheel brake systems contain an external end comprising
   (a) a discharge section containing external threads for matingly engaging said external end, said discharge section having a first internal passageway wherein said first internal passageway contains a first, a second and a third portion, said bottom end of said discharge section forms a first valve stop shoulder and a second valve stop shoulder defined by the juncture of one end of said second portion and one end of said third portion;
   (b) a compression spring partially contained within said internal passageway of the discharge section wherein the compression spring is larger in diameter than the first portion of the internal passageway of the discharge section but smaller in diameter than the second and third portion of the internal passageway of the discharge section; and
   (c) a sealing mechanism extended by the compression spring comprised of a head, a first and second section wherein said first and second sections contain a second internal passageway therein, said first head section is slidably received within said third portion of said first internal passageway of the discharge section, one end of said compression spring engages a shoulder defined by the juncture of one end of said first portion and one end of said second portion and the other end of said compression spring engages an internal shoulder of said sealing head; wherein said second section contains an opening passing from the outside of said second section to the second internal passageway for permitting the fluid pressure to flow therein, and wherein said first and second head sections define first and second stop elements thereon for abuttingly engaging said first and second stop shoulders when said discharge section is adjustably threaded in an inward and outward direction within said external end for allowing only the fluid pressure to move the sealing head stop elements in abutting engagement with said first and second stop shoulder when said discharge section is adjusted outwardly to regulate the fluid pressure through the first internal passageway and by manual actuation to move the sealing head stop element in abutting engagement with said first and second stop shoulders when said discharge section is adjusted inwardly to shut off the fluid pressure through said first internal passageway.

2. The improved brake bleeder screw of claim 1 wherein the head of the sealing mechanism can fit against the external end of a hydraulic wheel brake system.

3. The improved brake bleeder screw of claim 1 wherein said head is in the shape of a flattened cone.

4. The improved brake bleeder screw of claim 1 wherein said head is in the shape of a ball.

5. The improved brake bleeder screw of claim 1 wherein the discharge section, the compression spring and the sealing mechanism are secured together.

* * * * *